US 6,612,661 B2

(12) United States Patent
Udaka

(10) Patent No.: US 6,612,661 B2
(45) Date of Patent: Sep. 2, 2003

(54) DEVICE AND METHOD FOR DETECTING BRAKE OPERATING SPEED, AND DEVICE AND METHOD FOR CONTROLLING THE BRAKING OF VEHICLE

(75) Inventor: Satoshi Udaka, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/764,154

(22) Filed: Jan. 19, 2001

(65) Prior Publication Data

US 2001/0013722 A1 Aug. 16, 2001

(30) Foreign Application Priority Data

Feb. 10, 2000 (JP) ........................................ 2000-033660

(51) Int. Cl.[7] .............................. B60T 8/60; B60T 13/74
(52) U.S. Cl. .............................. 303/155; 303/DIG. 9; 303/3
(58) Field of Search ................................ 303/167, 155, 303/113.4, 177, DIG. 5, 5, 3, 10, 186, DIG. 9

(56) References Cited

U.S. PATENT DOCUMENTS

| 3,620,576 | A | * | 11/1971 | Wehde et al. ............... 303/154 |
| 3,833,270 | A | * | 9/1974 | Gotz et al. .................. 303/154 |
| 4,982,806 | A | * | 1/1991 | Yoshizawa et al. ......... 180/197 |
| 5,113,194 | A | * | 5/1992 | Krikorian et al. ........... 342/106 |
| 5,474,368 | A | * | 12/1995 | Sano ........................... 303/146 |
| 5,474,369 | A | * | 12/1995 | Inagaki et al. ............... 303/146 |
| 5,480,221 | A | * | 1/1996 | Morita et al. ............. 303/113.5 |
| 5,517,417 | A | * | 5/1996 | Iida .............................. 701/70 |
| 5,624,164 | A | * | 4/1997 | Tozu et al. ............... 303/113.5 |
| 5,673,981 | A | * | 10/1997 | Higashimata et al. ....... 303/155 |
| 5,706,196 | A | * | 1/1998 | Romstadt .................. 280/5.507 |
| 5,836,660 | A | * | 11/1998 | Brugger et al. ............. 303/155 |
| 5,967,628 | A | * | 10/1999 | Abe et al. ............... 303/122.12 |
| 6,045,198 | A | * | 4/2000 | Naito et al. ................. 303/154 |
| 6,161,905 | A | * | 12/2000 | Hac et al. .................... 303/139 |
| 6,238,019 | B1 | * | 5/2001 | Okazaki et al. ............. 303/146 |
| 6,289,271 | B1 | * | 9/2001 | Isono et al. ................... 701/31 |

FOREIGN PATENT DOCUMENTS

| DE | 195 40 397 C1 | | 10/1995 |
| JP | 1277764 A | * | 11/1989 |
| JP | 05147520 | | 6/1993 |
| JP | 10138895 | | 5/1999 |

* cited by examiner

Primary Examiner—Matthew C. Graham
Assistant Examiner—Melody M. Burch
(74) Attorney, Agent, or Firm—Oliff & Berridge, PLC

(57) ABSTRACT

A brake operating speed detecting device includes a plurality of filters having different cut-off frequencies and inputs thereto a vehicle body deceleration that changes at the time of braking. The state of distribution of output values obtained through the filters, or the difference d between the output values, corresponds to the rising speed of the vehicle body deceleration. Because the rising speed corresponds to the brake operating speed, the brake operating speed can be detected from the state of distribution of the output values or the difference d.

16 Claims, 8 Drawing Sheets

DEVICE AND METHOD FOR DETECTING BRAKE OPERATING SPEED, AND DEVICE AND METHOD FOR CONTROLLING THE BRAKING OF VEHICLE

INCORPORATION BY REFERENCE

The disclosure of Japanese Patent Application No. 2000-033660 filed on Feb. 10, 2000 including the specification, drawings and abstract is incorporated herein by reference in its entirety.

BACKGROUND OF THE INVENTOIN

1. Field of the Invention

The invention relates to a device and a method for detecting the speed of a braking operation, and to a device and a method for controlling braking forces applied to rear wheels with respect to braking forces applied to front wheels.

2. Description of Related Art

If a brake pedal is depressed quickly during a hard braking operation, the deceleration of a vehicle body increases substantially, and a substantial amount of load is displaced to the front part of the vehicle body. As a result, the load applied to front wheels increases, and the load applied to rear wheels decreases. If an equal brake fluid pressure is transmitted to brake devices for the front and rear wheels under such circumstances, the rear wheels tend to become locked. If the rear wheels are locked, the attitude of the vehicle may be affected. Thus, there is known an electronic braking force distribution (EBD) system that electrically controls, if such hard braking has been detected, the distribution of the brake fluid pressures for the rear wheels with respect to the brake fluid pressures for the front wheels such that the braking forces generated in the brake devices for the rear wheels are reduced with respect to the braking forces generated in the brake devices for the front wheels (as disclosed, e.g., in Japanese Patent Application Laid-Open No. 5-147520).

In Japanese Patent Application Laid-Open No. 5-147520, the brake fluid pressure force-fed from a master cylinder is detected by a pressure sensor, and it is judged from the state of changes in the detected brake fluid pressure whether or not a hard braking operation has been performed. Accordingly, this system requires the provision of a separate pressure sensor for detecting a hard braking operation. Further, if there arises a malfunction in the detection system including the pressure sensor, it is impossible to judge whether or not a hard braking operation has actually been performed.

SUMMARY OF THE INVENTION

The invention has been made to address such problems. It is one object of the invention to provide a braking operation speed detecting device capable of detecting the brake operating speed from quantities indicative of the state of a vehicle detected by existing sensors. It is also an object of the invention to provide a vehicular brake control device for controlling braking forces applied to rear wheels with respect to braking forces applied to front wheels using the detection result of the brake operating speed detecting device.

In order to address the aforementioned problems, a brake operating speed detecting device according to a first aspect of the invention is designed to: (a) filter vehicle body decelerations sequentially obtained based on rotational speeds of wheels by means of a plurality of filters having different cut-off frequencies, and (b) detect the brake operating speed based on output values obtained from the plurality of filters.

It is assumed herein that a certain filter has a cut-off frequency f. If the cut-off frequency f is higher than the rising speed of a vehicle body deceleration as the input value of the filter, the output value of the filter is not affected by the cut-off frequency f. In such a situation, the input value input to the filter is approximately equal to the output value output from the filter. On the other hand, if the cut-off frequency f of the filter is lower than the rising speed of the vehicle body deceleration, the output value of the filter is affected by the cut-off frequency f. In such a situation, the output value of the filter changes with delay in response to a change in the input value of the filter. As a result, the change in the output value is damped with respect to the change in the input value. Accordingly, for example, if vehicle body decelerations sequentially calculated based on the detected rotational speeds of the wheels are input to a plurality of filters having different cut-off frequencies, and if a filter whose output value tends to be damped is identified, the frequency higher than the cut-off frequency of the filter by a predetermined value corresponds to the rising speed indicative of an increasing state of the vehicle body deceleration. The rising speed of the vehicle body deceleration corresponds to the brake operating speed, namely, the speed at which the brake pedal is depressed. Thus, using such relations, the brake operating speed can be detected based on output values obtained through the respective filters.

Thus, it is possible to detect the brake operating speed based on the wheel speeds already detected during ABS control or the like, without employing a pressure sensor for directly detecting the brake fluid pressure.

In the brake operating speed detecting device according to the first aspect of the invention, the brake operating speed may be detected based on the state of distribution of output values obtained through the respective filters.

If vehicle body decelerations sequentially calculated based on the detected rotational speeds of the wheels are input to the respective filters, the output values of those filters whose cut-off frequency is higher than the rising speed of the vehicle body deceleration are hardly damped and remain within a predetermined range A. On the other hand, in those filters whose cut-off frequency is lower than the rising speed of the vehicle body deceleration, the input value is damped to a greater extent as the set cut-off frequency lowers. For this reason, the output value departs from the predetermined range A to a degree corresponding to the cut-off frequency and becomes discrete. Based on such a state of distribution of the output values of the filters, it is possible to specify a frequency corresponding to the rising speed of the vehicle body deceleration and to thereby detect the brake operating speed from the specified frequency.

In the brake operating speed detecting device according to the first aspect of the invention, the brake operating speed may be detected based on the difference between output values obtained through the respective filters.

The output value of a filter having a cut-off frequency higher than the rising speed of the vehicle body deceleration is different from the output value of a filter having a cutoff frequency lower than the rising speed of the vehicle body deceleration. Because this difference changes in accordance with the increasing state of the vehicle body deceleration, namely, the brake operating speed, it is possible to detect the brake operating speed based on the difference between the output values of the filters.

A brake control device according to a second aspect of the invention is designed to: (a) filter the vehicle body deceleration obtained based on the state of changes in the rotational speeds of wheels by means of a plurality of filters having different cut-off frequencies, (b) detect the brake operating speed based on output values obtained from the plurality of filters, and (c) start braking force distribution control if it is judged based on the detected brake operating speed that a hard braking operation has been performed.

The brake operating speed is detected based on the output values obtained through the respective filters. If it is judged based on the detected brake operating speed that a hard braking operation has been performed, braking force distribution control is started. Thereby operation control of an actuator is performed immediately such that the braking forces applied to the rear wheels are reduced with respect to the braking forces applied to the front wheels.

By this operation, it becomes possible to detect that a hard braking operation has been performed, without employing a pressure sensor for directly detecting the brake fluid pressure. If a hard braking operation has been performed, it becomes possible to immediately perform operation control of the actuator for reducing the braking forces applied to the rear wheels with respect to the braking forces applied to the front wheels. Therefore, adjustment of the braking forces applied to the rear wheels can be started at a suitable timing corresponding to the brake operating speed. Consequently, it becomes possible to prevent the rear wheels from being locked even if a hard braking operation has been performed.

A brake control device according to a third aspect of the invention is designed to: (a) filter a vehicle body deceleration obtained based on the state of change in the rotational speeds of wheels by means of a plurality of filters having different cut-off frequencies, and (b) detect the brake operating speed based on output values obtained from the plurality of filters. By comparing the rotational speeds of the front and rear wheels with each other, the state where the rotational speeds of the rear wheels have been reduced with respect to the rotational speeds of the front wheels by a predetermined value or more is detected. Braking force distribution control is started based on the state of the detected brake operating speed and rotational speeds.

In braking force distribution control, the braking forces generated in the rear wheels are reduced with respect to the braking forces generated in the front wheels by controlling fluid pressures for generating the braking forces in the respective wheels.

In the case where the timing for starting braking force distribution control is judged based merely on the rotational speeds of the wheels, braking force distribution control is not started until the rotational speeds of the rear wheels actually fall and the difference between the rotational speeds of the front and rear wheels becomes equal to or greater than a predetermined value. However, if a hard braking operation has been performed, the condition for starting ABS control may be fulfilled before the difference between the rotational speeds of the front and rear wheels becomes equal to or greater than the predetermined value. Thus, the timing for starting braking force distribution control is determined considering both the detection result of performance of a hard braking operation and the detection result of a fall in the rotational speeds of the rear wheels.

By this operation, it becomes possible to surely start control by a braking force distribution controller if a hard braking operation has been performed, even before the difference between the rotational speeds of the front and rear wheels becomes equal to or greater than a predetermined value.

The aspects of the invention are not limited to the brake operating speed detecting device and the brake control device as mentioned above. Further aspects of the invention include, for example, a vehicle equipped with a brake operating speed detecting device or a brake control device, and a brake operating speed detecting method or a brake control method.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Hereinafter, an embodiment of the invention will be described with reference to the accompanying drawings.

Figure 1:
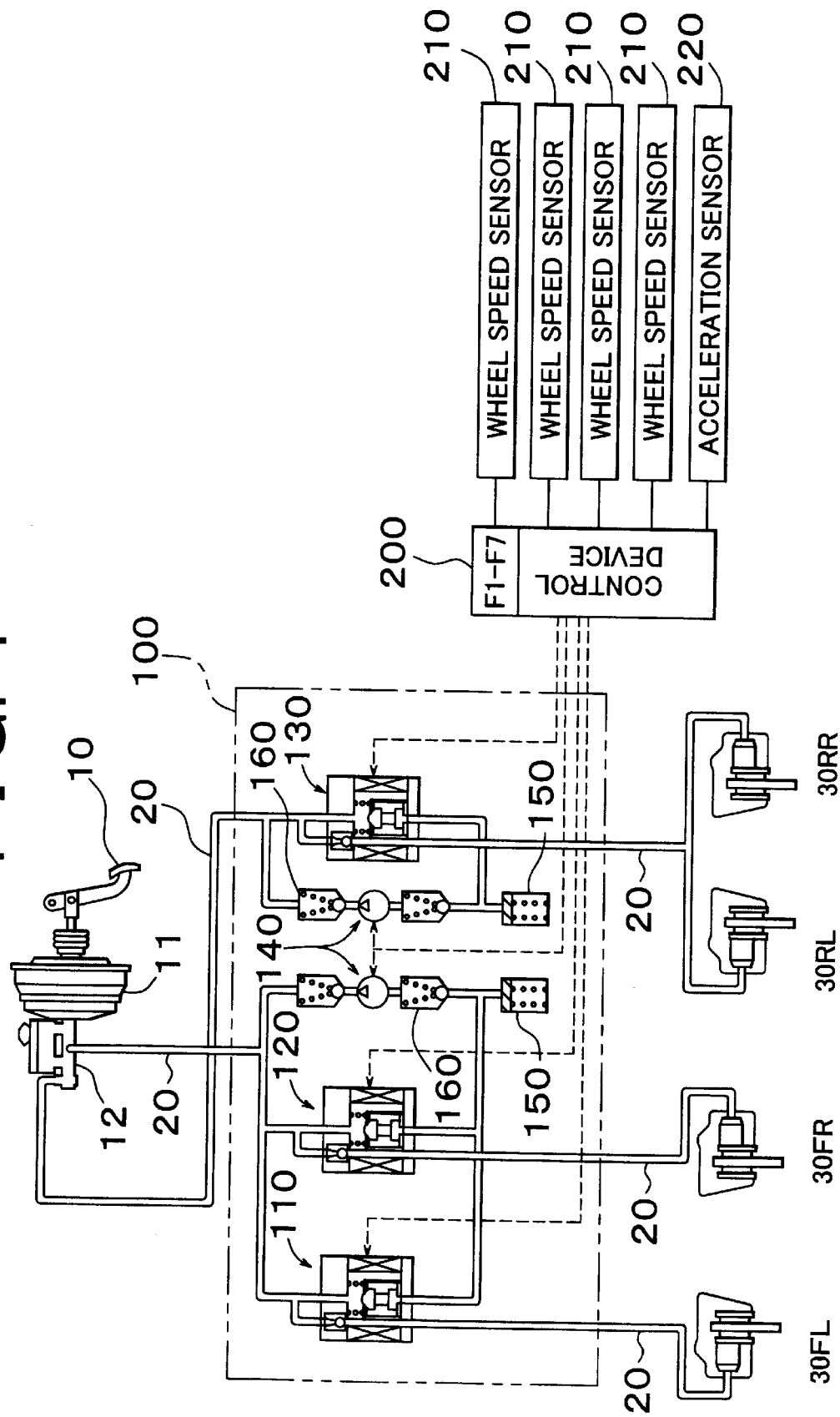
FIG. 1 is a block diagram showing the overall structure of a brake control device according to a first embodiment of the invention.

FIG. 1 schematically shows the structure of a brake control device according to an embodiment of the invention. If a brake pedal 10 is depressed, the depressing force is amplified through a booster 11 and the fluid pressure corresponding to the depressing force is generated in a master cylinder 12. A brake fluid force-fed from the master cylinder is introduced into an actuator through pipe lines 20. The brake fluid that has been supplied to an actuator 100 is supplied to a wheel cylinder 30FL constituting a brake device for a front-left wheel, a wheel cylinder 30FR constituting a brake device for a front-right wheel, a wheel cylinder 30RL constituting a brake device for a rear-left wheel, and a wheel cylinder 30RR constituting a brake device for a rear-right wheel.

The actuator 100 is composed of three fluid pressure systems, namely, a front-left-wheel fluid pressure system, a front-right-wheel fluid pressure system and a rear-wheel fluid pressure system. Solenoid valves 110, 120 and 130 are disposed in the front-left-wheel fluid pressure system, the front-right-wheel fluid pressure system and the rear-wheel fluid pressure system respectively. Fluid pressure pumps 140 are provided for the front-wheel-side and rear-wheel-side fluid pressure systems to force-feed a brake fluid accumulated in a reservoir 150. Check valves 160 are disposed on the discharge side and the suction side of the fluid pressure pumps 140 to prevent the brake fluid from flowing reversely.

The solenoid valves 110, 120 and 130 in the actuator 100 can be switched among three modes (three positions), namely, a pressure-increasing mode wherein the master cylinder 12 communicates with the solenoid valves 110, 120 and 130, a pressure-reducing mode wherein the wheel cylinders 30FL, 30FR, 30RL and 30RR communicate with the reservoir 150, and a pressure-holding mode wherein the pipe lines 20 extending from the solenoid valves 110, 120 and 130 to the wheel cylinders 30FL, 30FR, 30RL and 30RR are shut off.

Figure 9A:
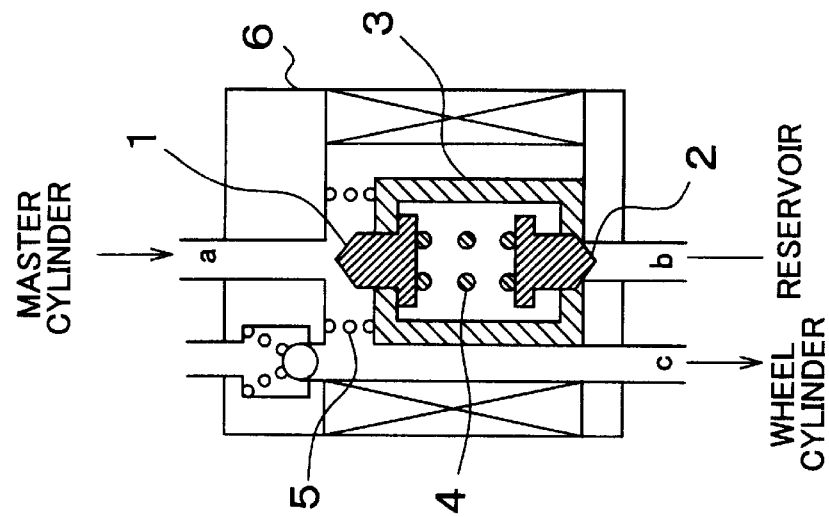
FIGS. 9A, 9B and 9C are explanatory views showing operations of a solenoid valve in its pressure-reducing mode, pressure-holding mode and pressure-increasing mode respectively.
Figure 9B:
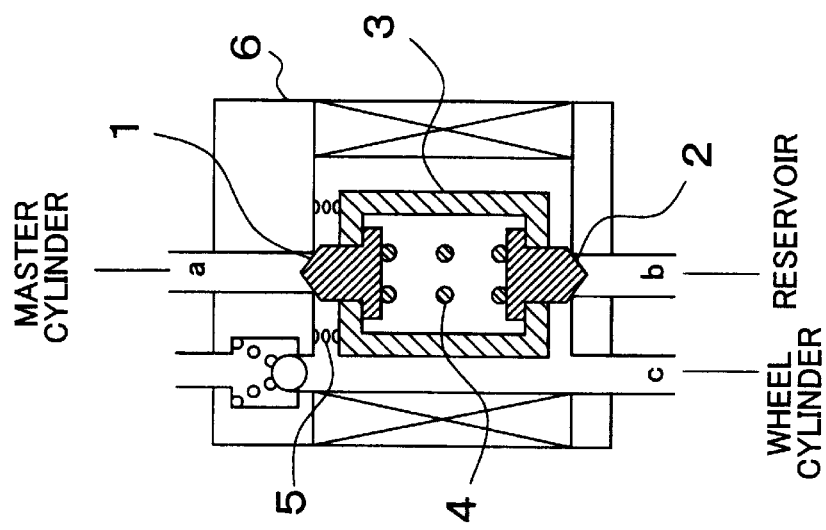
Figure 9C:
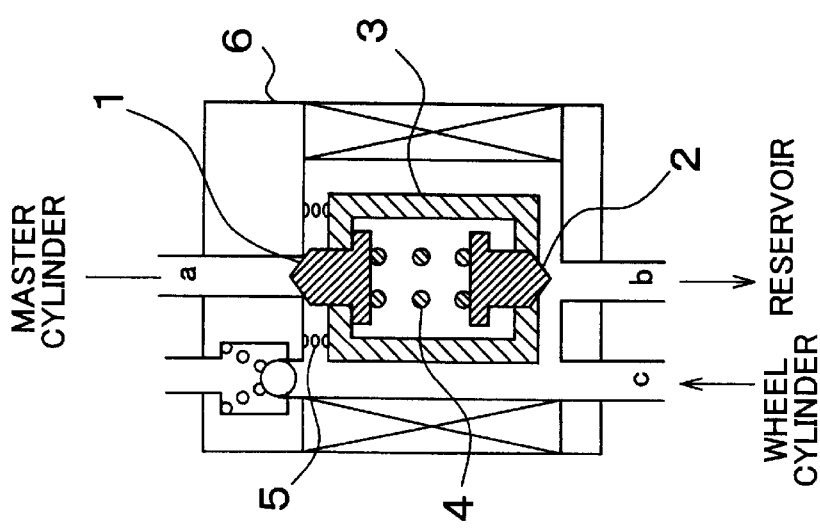

FIGS. 9A–9C show the structure and operation of a solenoid valve. The solenoid valve shown in FIGS. 9A–9C is structurally the same as the solenoid valves 110, 120 and 130 shown in FIG. 1. The solenoid valve is accommodated in a valve case 6 such that valve bodies 1, 2 and a frame body 3 can be displaced within a predetermined range. The valve bodies 1, 2, which are urged to move away from each other by a spring 4, are accommodated in the frame body 3 such that heads of the valve bodies 1, 2 protrude outwards from the frame body 3. An a-port of the solenoid valve is formed in a portion corresponding to the head of the valve body 1, whereas a b-port of the solenoid valve is formed in a portion corresponding to the head of the valve body 2. Also disposed between the valve case 6 and the frame body 3 is a spring 5, which presses the frame body 3 downwards.

Through an electromagnetic force of the solenoid, the valve body 2 and the frame body 3 can be individually switched between two positions, namely, an upper position and a lower position. If the valve body 2 and the frame body 3 move upwards or downwards individually, the three modes, namely, the pressure-increasing mode, the pressure-reducing mode and the pressure-holding mode are switched from one to another.

In the case of the pressure-reducing mode (FIG. 9A), since the valve body 1 closes the a-port and the valve body 2 retreats to open the b-port, a brake fluid in the wheel cylinders 30FL, 30FR, 30RL and 30RR is fed to the reservoir 150 through a c-port and the b-port of the solenoid valve. At this moment, the fluid pressure pump 140 is also driven, and the brake fluid accumulated in the reservoir 150 is returned to the master cylinder 12.

In the case of the pressure-holding mode (FIG. 9B), since the valve body 1 closes the a-port and the valve body 2 is driven to be displaced downwards and closes the b-port, the pressures in the wheel cylinders 30FL, 30FR, 30RL and 30RR are held.

In the case of the pressure-increasing mode (FIG. 9C), since the frame body 3 is driven to be displaced downwards starting from the state of the pressure-holding mode shown in FIG. 9B, the frame body 3 presses the valve body 1 downwards to open the a-port, with the valve body 2 keeping the b-port closed. Accordingly, a brake fluid in the master cylinder 12 is fed to the wheel cylinders 30FL, 30FR, 30RL and 30RR, thus raising the fluid pressures in the wheel cylinders 30FL, 30FR, 30RL and 30RR.

When control is not being performed, the solenoid valves 110, 120 and 130 are maintained in the pressure-increasing mode. Thereby fluid pressures corresponding to a depressing force applied to the brake pedal 10 are generated in the wheel cylinders 30FL, 30FR, 30RL and 30RR.

Such control of the operation of the actuator 100 is performed by a control device 200. Detection results obtained from wheel speed sensors 210 disposed separately for the four wheels, an acceleration sensor 220 for detecting the longitudinal acceleration of the vehicle body, a yaw rate sensor for detecting the yaw rate, and the like are input to the control device 200. Based on these detection results, processings of EBD control are performed to electrically control the brake fluid pressures to be distributed to the rear wheels with respect to those to be distributed to the front wheels. In accordance with the result of the EBD control, the operation control of the actuator 100 is performed.

The control device 200 also performs processings of detecting the brake operating speed, namely, the speed at which the brake pedal 10 is depressed. The processings performed by the control device 200 to detect the brake operating speed will be described with reference to a flowchart shown in FIG. 2.

In step (hereinafter referred to as "S") 102, the detection results of the wheel speed sensors 210 are read. Then in S104, the vehicle body speed $V_{SO}$ is calculated. More specifically, the vehicle body speed is calculated based on the maximum one of the wheel speeds read in S102, and the vehicle body speed that could change from the vehicle body speed calculated in the preceding routine is calculated from the detection result of the acceleration sensor 220. The smaller one of both the calculation results is set as the vehicle body speed $V_{SO}$ in the present routine.

Then in S106, the vehicle body deceleration $DV_{SO}$, namely, the speed at which the vehicle body speed $V_{SO}$ decreases is calculated based on the vehicle body speed $V_{SO(now)}$ calculated in S104, the vehicle body speed $V_{SO(old)}$ calculated in the preceding routine, and the sampling time T therebetween.

Then in S108, the vehicle body deceleration $DV_{SO}$ calculated in S106 is input to filters (low-pass filters) having different cut-off frequencies, and filtering processings are performed in the respective filters.

FIGS. 3A–3E show examples of temporal changes in the outputs obtained in the case where the vehicle body decelerations $DV_{SO}$ calculated for respective routines have been sequentially input to filters. As an example, it is assumed herein that five filters F1 through F5 are prepared to perform filtering processings and that the filters F1 through F5 have cutoff frequencies f1 through f5 (f1>f2>f3>f4>f5) respectively. It is also assumed that at least the cut-off frequency f1 of the filter F1 is set higher than the assumed rising speed of the vehicle body deceleration $DV_{SO}$.

FIG. 3A shows the case where the vehicle body deceleration $DV_{SO}$ as a filter input is the highest. As described above, since the cut-off frequency f1 of the filter F1 is set higher than the assumed rising speed of the vehicle body deceleration $DV_{SO}$, the output value $DV_{SO}f1$ obtained through the filter F1 is hardly damped and hence becomes approximately equal to the input value $DV_{SO}$. In this case, since the cut-off frequencies f2 through f5 of the filters F2 through F5 are lower than the rising speed of the vehicle body deceleration, the output value changes in slow response to changes in the input value $DV_{SO}$. As the cutoff frequencies lower, the output values $DV_{SO}f2$ through $DV_{SO}f5$ of the filters F2 through F5 rise with a longer delay with respect to the output value $DV_{SO}f1$.

If the rising speed of the vehicle body deceleration $DV_{SO}$ is between the cut-off frequencies f2, f3, the output values $DV_{SO}f1$, $DV_{SO}f2$ of the filters F1, F2 are approximately equal to each other and contained within a predetermined range A, the output values $DV_{SO}f3$ through $DV_{SO}f5$ of the filters F3 through F5 rise with a delay with respect to the output values $DV_{SO}f1$, $DV_{SO}f2$, and the output values $DV_{SO}f3$ through $DV_{SO}f5$ are discrete, as can be seen from FIG. 3B.

If the rising speed of the vehicle body deceleration $DV_{SO}$ is between the cut-off frequencies f3, f4, the output values $DV_{SO}f1$ through $DV_{SO}f3$ of the filters F1 through F3 are approximately equal to one another and contained within the predetermined range A, and the output values $DV_{SO}f4$, $DV_{SO}f5$ of the filters F4, F5 rise with a delay with respect to the output values $DV_{SO}f1$ through $DV_{SO}f3$, as can be seen from FIG. 3C.

Furthermore, if the rising speed of the vehicle body deceleration $DV_{SO}$ is between the cut-off frequencies f4, f5, the output values $DV_{SO}f1$ through $DV_{SO}f4$ of the filters F1 through F4 are approximately equal to one another and contained within the predetermined range A, and the output value $DV_{SO}f5$ of the filter F5 rises with a delay with respect to the output values $DV_{SO}f1$ through $DV_{SO}f4$, as can be seen from FIG. 3D. If the rising speed of the vehicle body deceleration $DV_{SO}$ is lower than the cut-off frequency f5, the output values $DV_{SO}f1$ through $DV_{SO}f5$ of the filters F1 through F5 are approximately equal to one another and contained within the predetermined range A, as can be seen from FIG. 3E.

Figure 4:
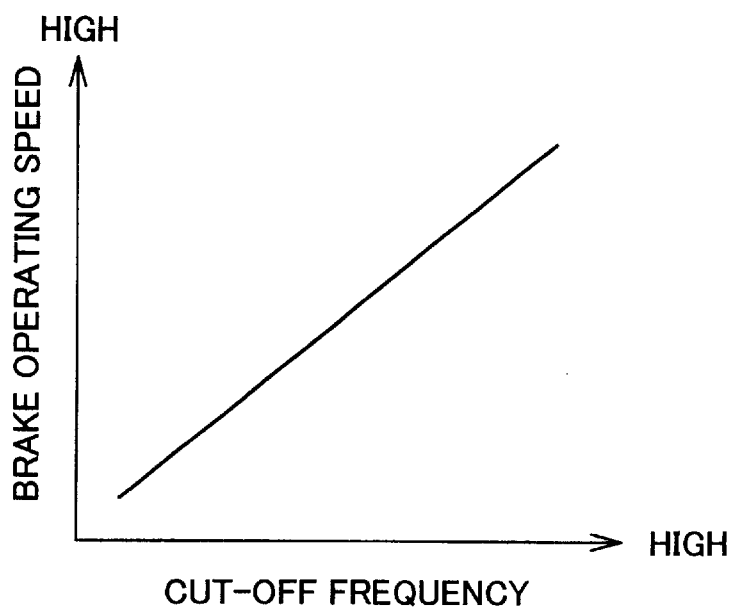
FIG. 4 is a map showing a relation between cut-off frequencies and brake operating speeds.

In this manner, the frequencies (cut-off frequencies) corresponding to the rising speed of the vehicle body deceleration $DV_{SO}$ can be specified based on the distribution of the output values $DV_{SO}f1$ through $DV_{SO}f5$ obtained through the filters F1 through F5. Because the rising speed of the vehicle body deceleration $DV_{SO}$ corresponds to the brake operating speed as the speed at which the brake pedal 10 is depressed, the frequency corresponding to the rising speed of the vehicle body deceleration $DV_{SO}$ corresponds to the brake operating speed $V_{pedal}$, as shown in FIG. 4.

The frequency corresponding to the rising speed of the vehicle body deceleration $DV_{SO}$ can be specified based on the output values $DV_{SO}f1$ through $DV_{SO}f5$ in various manners. As an example, in S110 of FIG. 2, first of all, the maximum value MAX of the output values $DV_{SO}f1$ through $DV_{SO}f5$ is specified. Then in S112, the filter assuming the minimum one of the filter output values different from the maximum value A by the predetermined range A or more (the filter output values $\geq$(MAX−A)) is specified based on the predetermined range A where the filter output substantially coincides with the specified maximum value MAX. Then in S114, the corresponding brake operating speed $V_{pedal}$ is determined based on the cut-off frequency of the specified filter, using the map shown in FIG. 4.

In such processings of detecting the brake operating speed, the distances among the cut-off frequencies of the respective filters are set narrow, and a great number of filters are provided. This makes it possible to detect the brake operating speed with higher precision.

Figure 2:
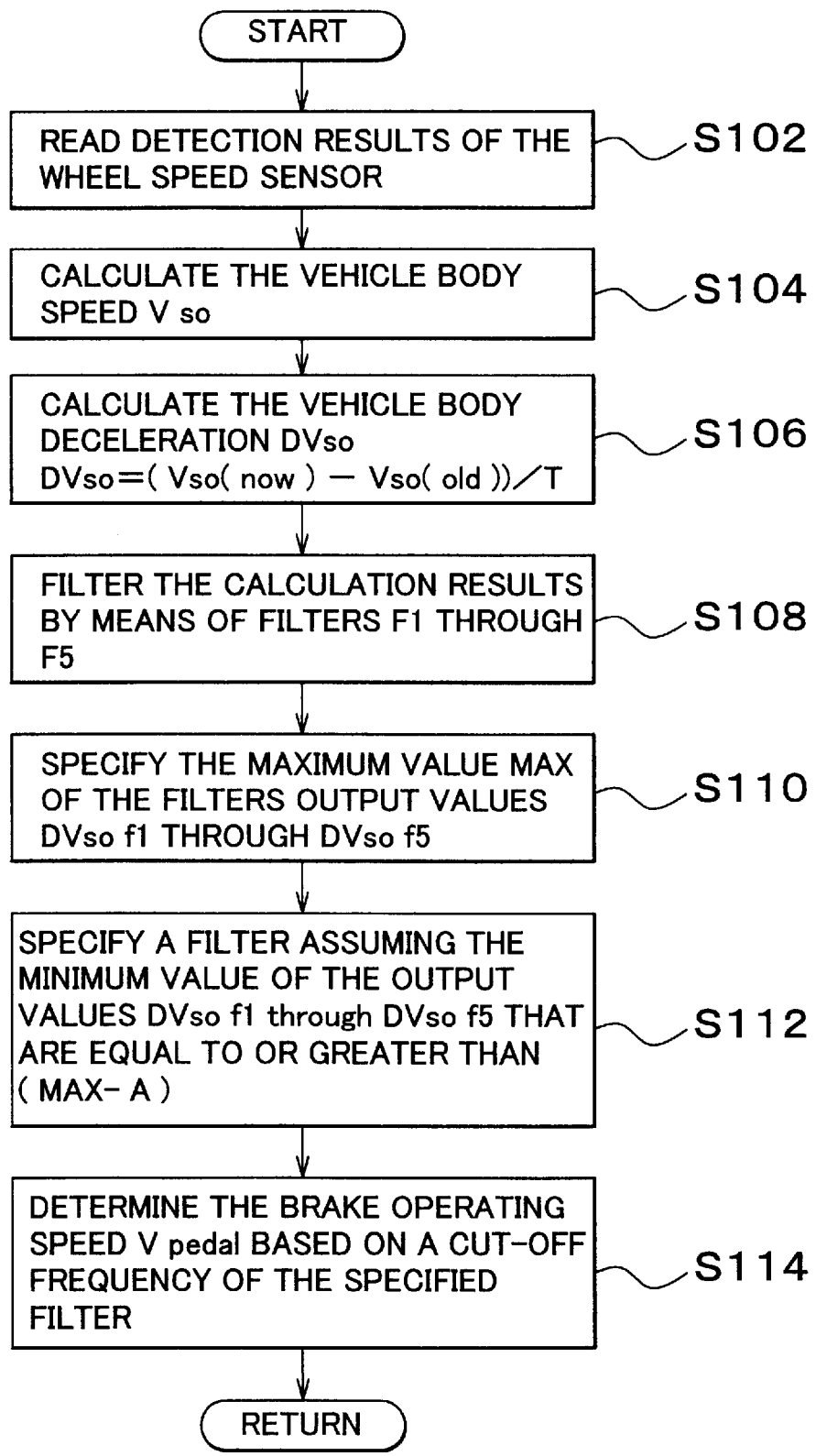
FIG. 2 is a flowchart showing processings of detecting the brake operating speed.
Figure 3:
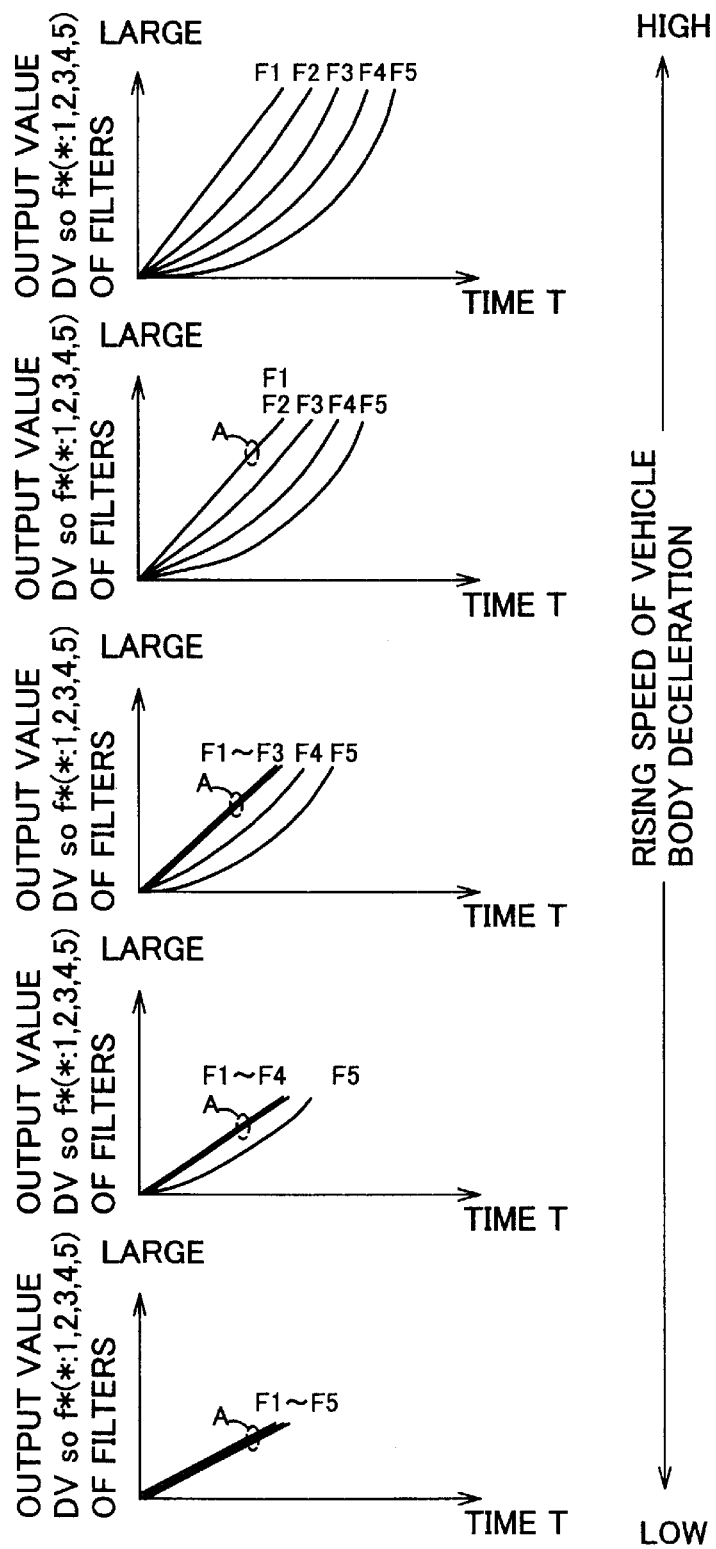
FIGS. 3A through 3E show output values of respective filters corresponding to the rising speed of the deceleration of a vehicle.

FIGS. 2, 3 show, as an example, the case where a great number of filters are used. However, for example, even in the case where two filters, namely, a filter F6 having a cutoff frequency f6 that is higher than the rising speed of the assumed vehicle body deceleration $DV_{SO}$ and a filter F7 having a relatively low cut-off frequency f7 are provided, it is possible to detect the brake operating speed.

Figure 5:
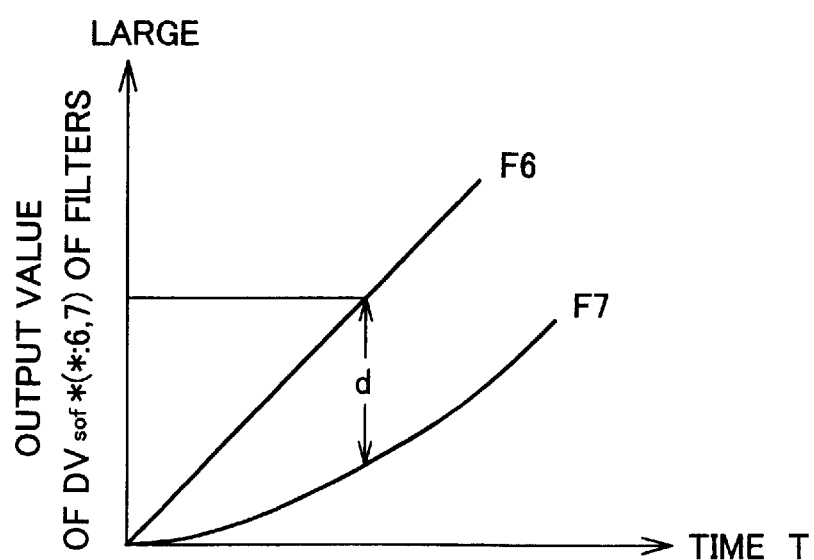
FIG. 5 shows a difference d between output values from two filters having different cut-off frequencies.

If it is assumed that the output values $DV_{SO}f6$, $DV_{SO}f7$ of the filters F6, F7 corresponding to the vehicle body deceleration $DV_{SO}$ have changed with the passage of time as shown in FIG. 5, the output value $DV_{SO}f6$ of the filter F6 is approximately equal to the actual vehicle body deceleration $DV_{SO}$. Referring to the output values $DV_{SO}f6$, $DV_{SO}f7$ at the time of a predetermined vehicle body deceleration (e.g. the vehicle body deceleration=0.4 G), if the rising speed of the vehicle body deceleration $DV_{SO}$ has increased, the output value $DV_{SO}f6$ of the filter F6 becomes approximately equal to the input value. On the other hand, the output value $DV_{SO}f7$ of the filter F7 increases gently due to the cut-off frequency f7, and the output value $DV_{SO}f7$ does not change substantially even if the rising speed of the vehicle body deceleration $DV_{SO}$ has increased. In other words, the output value $DV_{SO}f6$ of the filter F6 is greater than the output value $DV_{SO}f7$ of the filter F7.

Figure 6:
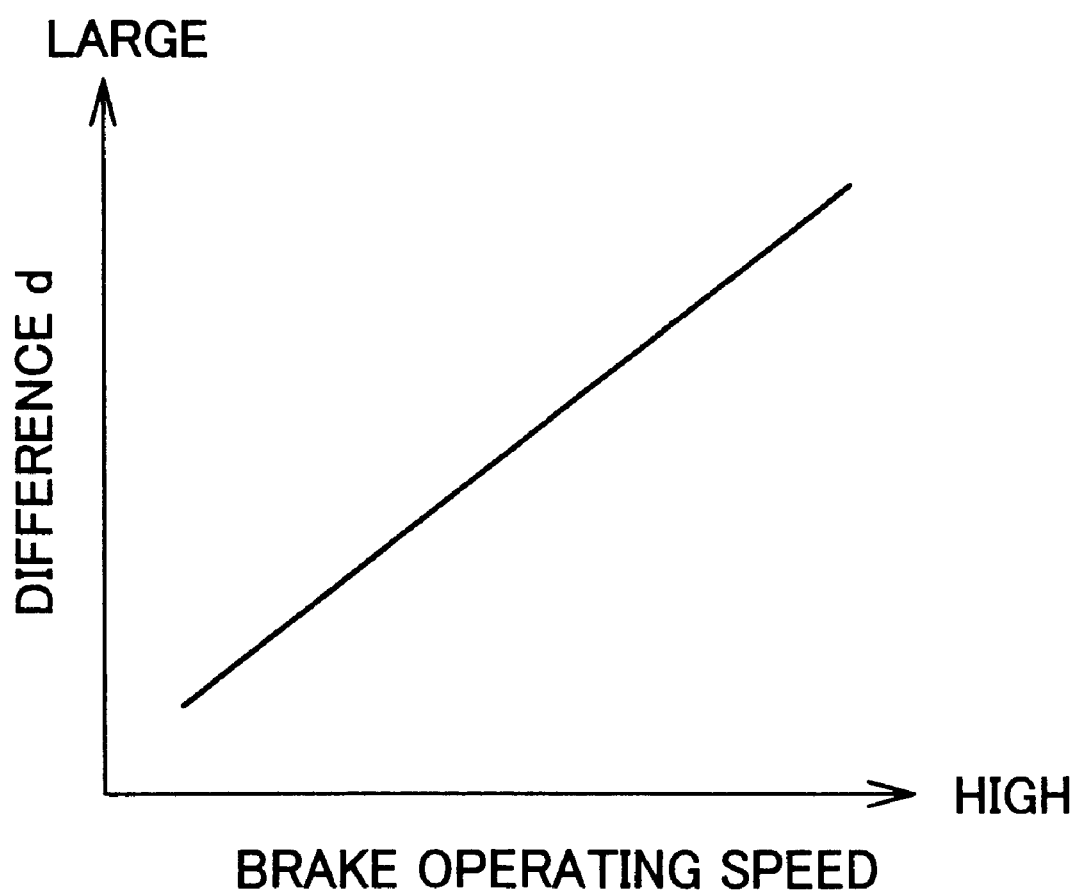
FIG. 6 is a map showing a relation between differences d as shown in FIG. 5 and brake operating speeds.

It is assumed herein that the difference between the output values $DV_{SO}f6$, $DV_{SO}f7$ at the time of the predetermined vehicle body deceleration is denoted by d. As the rising speed of the vehicle body deceleration $DV_{SO}$ increases, the difference d increases. Accordingly, the difference d and the brake operating speed $V_{pedal}$ establish a relation as shown in FIG. 6, and the brake operating speed $V_{pedal}$ can be detected from the difference d.

Figure 7:
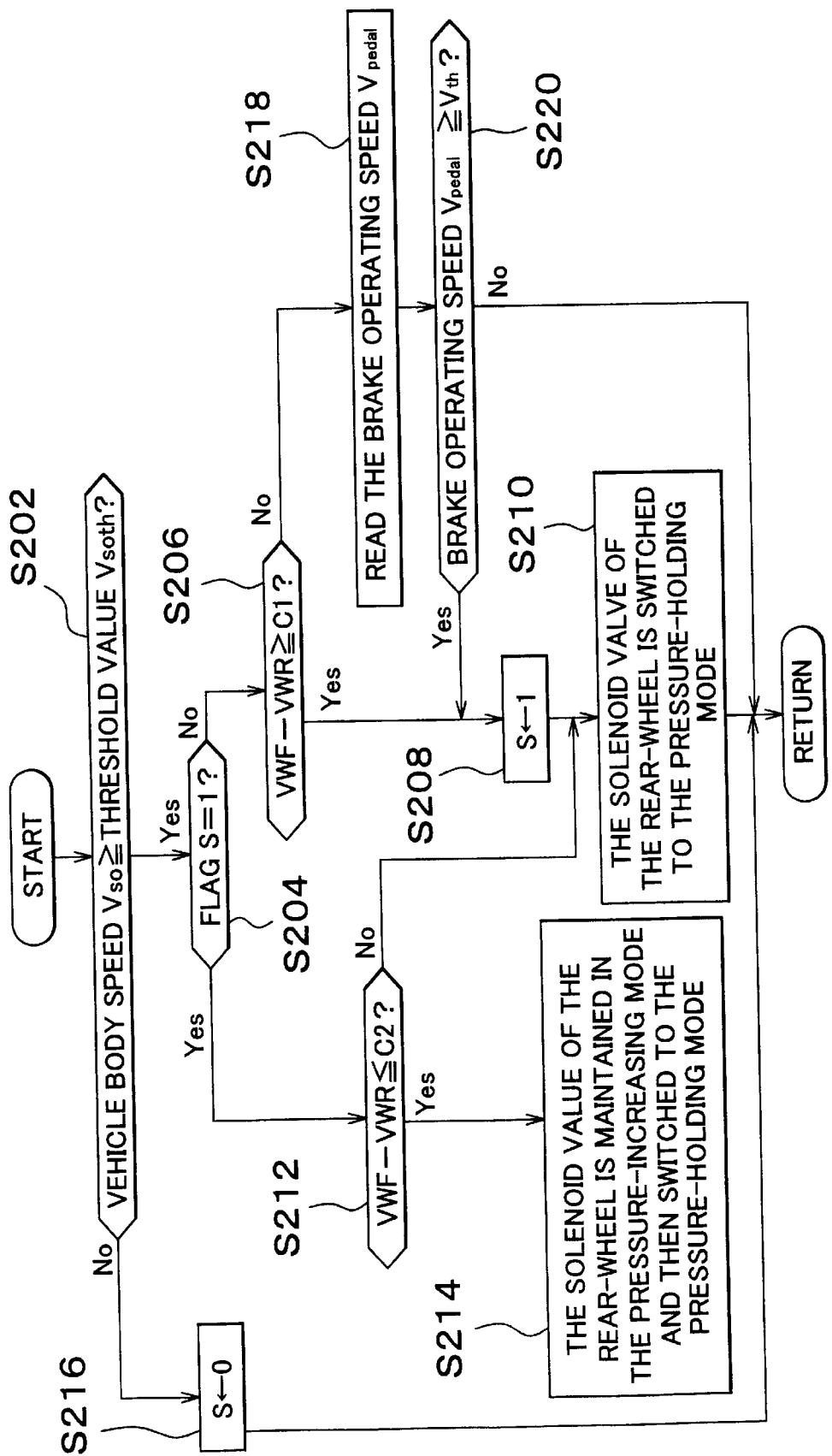
FIG. 7 is a flowchart showing the process of EBD control.

An example in which the brake operating speed thus detected is applied to the process of EBD control will be described based on a flowchart shown in FIG. 7, while referring to FIG. 8.

First of all, it is judged in S202 whether or not the vehicle body speed V is equal to or higher than a threshold value $V_{SOth}$. If "Yes", the operation proceeds to S204 where it is judged whether or not a flag S indicating whether or not EBD control is being performed has been set to 1. At the outset, since the flag S is reset to 0, the judgment in S204 results in "No" and the operation proceeds to S206.

In S206, it is judged whether or not the difference of the rear-wheel-side wheel speed VWR from the front-wheel-side wheel speed VWF is equal to or greater than a predetermined value C1. As an example, the higher one of the wheel speeds of the front-left and front-right wheels is set as the front-wheel-side wheel speed VWF, and likewise, the higher one of the wheel speeds of the rear-left and rear-right wheels is set as the rear-wheel-side wheel speed VWR.

Figure 8A:
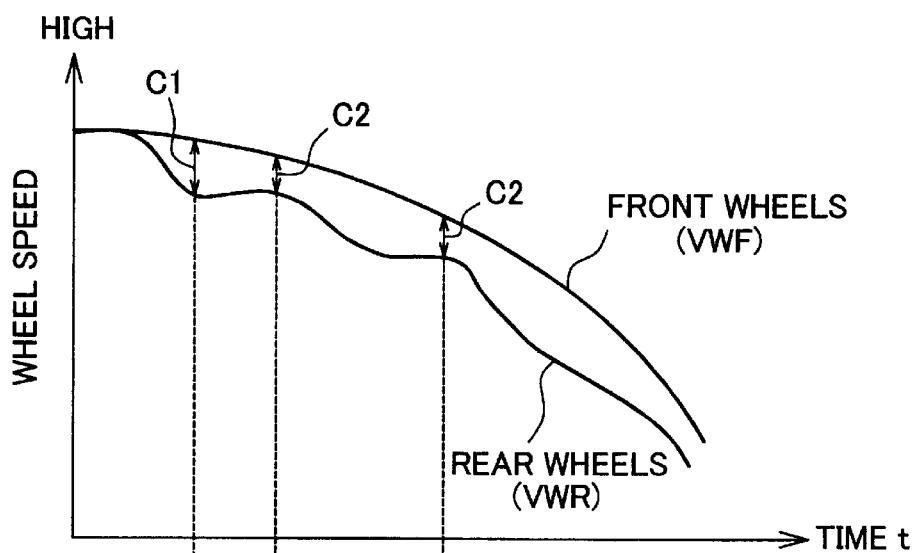
FIG. 8A shows in a time-series manner changes in the speeds of front and rear wheels during performance of EBD control.
Figure 8B:
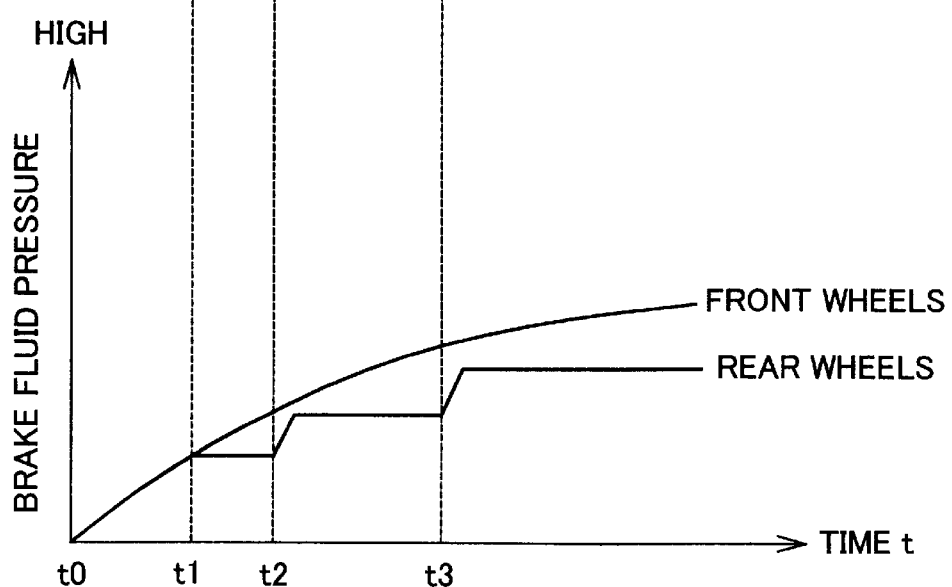
FIG. 8B shows in a time-series manner changes in the brake fluid pressures of the front and rear wheels during performance of EBD control.

As shown in FIGS. 8A and 8B, after the start of the braking operation at a time t0, the difference of the rear-wheel-side wheel speed VWR from the front-wheel-side wheel speed VWF becomes equal to or greater than the predetermined value C1 at a time t1. Therefore, the judgment in S206 results in "Yes", and the operation proceeds to S208. In S208, the flag S is set to 1 to indicate that EBD control is being performed.

Then in S210, the solenoid of the solenoid valve 130 in the rear-wheel fluid pressure system is driven, so that the solenoid valve 130 is switched to the pressure-holding mode. The brake fluid pressures in the wheel cylinders 30FL, 30FR, 30RL and 30RR for the front and rear wheels all tend to increase from the time t0 to the time t1. However, due to the control in S210, the brake fluid pressures in the rear-wheel-side wheel cylinders 30RL, 30RR are kept constant at the time t1, and the front-wheel-side wheel cylinders 30FL, 30FR are in communication with the master cylinder 12. Therefore, application of a pressure corresponding to the depressing force of the brake pedal 10 continues, and hence, the brake fluid pressure keeps rising. Because of this operation, the speed at which the rear-wheel-side wheel speed VWR decreases slows down, so that the difference between the wheel speeds of the front and rear wheels (VWF−VWR) tends to decrease.

The processings starting from S202 are then resumed. If the vehicle body speed $V_{SO}$ is equal to or higher than the threshold value $V_{SO}th$, the operation proceeds from S202 to S204. Because the flag S has been set to 1 in the preceding routine, the operation proceeds to S212.

In S212, it is judged whether or not the difference between the wheel speeds of the front and rear wheels (VWF−VWR) has become equal to or smaller than a predetermined value C2. If "No" in S212, the operation proceeds to S210 where the solenoid valve 130 is maintained in the pressure-holding mode.

Because the difference between the wheel speeds of the front and rear wheels (VWF−VWR) becomes equal to a predetermined value C2 (C1>C2) at a time t2, the judgment in S212 results in "Yes" and the operation proceeds to S214. In S214, the solenoid valve 130 for the rear-wheel fluid pressure system is switched to the pressure-increasing mode for a predefined short period, and thereafter, switched to the pressure-holding mode again. Through this control, the brake fluid pressures in the rear-wheel-side wheel cylinders 30RL, 30RR are raised and then maintained. For this reason, the rear-wheel-side wheel speed VWR decreases from the time t2 to a time t3 as shown in FIG. 8A.

For every routine, from the time t2 to the time t3, the judgment in S212 results in "No" and the processing of S210 is repeated. At the time t3, the judgment in S212 results in "Yes", and the operation proceeds to S214 where the brake fluid pressures in the rear-wheel-side wheel cylinders 30RL, 30RR are raised.

After EBD control has been started in this manner, the processing of S210 or S214 is performed to control the brake fluid pressures applied to the rear-wheel-side wheel cylinders 30RL, 30RR. Thereby the distribution of the braking force applied to the rear wheels with respect to that applied to the front wheels can be made approximate to the ideal curve.

As the routine is repeated, if the judgment in S202 results in "No", namely, if the vehicle body speed $V_{SO}$ has become lower than a threshold value $V_{SO}th$, the operation proceeds to S216 where the flag S is reset to 0 to indicate that EBD control has been completed.

In a series of such EBD control processings, the brake operating speed $V_{pedal}$ obtained by the aforementioned detection processings is used if the judgment in S206 results in "No", namely, in the case where the difference between the wheel speeds of the front and rear wheels (VWF−VWR) is smaller than the predetermined value C1 and where the normal condition for starting EBD control has not been fulfilled. In this case, the operation proceeds to S218 where the brake operating speed $V_{pedal}$ detected based on one of the aforementioned detection processings is read. Then in S220, the brake operating speed $V_{pedal}$ thus read is compared with a predetermined criterion value $V_{th}$. If the brake operating speed $V_{pedal}$ is lower than the criterion value $V_{th}$ (if "No" in S220), the present routine is terminated immediately. If the brake operating speed $V_{pedal}$ is equal to or higher than the criterion value $V_{th}$ (if "Yes" in S220), it is judged that a hard braking operation has been performed, and the operation proceeds to S208 where the process of EBD control is started immediately.

If the condition for starting EBD control is judged based merely on S206, EBD control may not be started until the difference between the wheel speeds of the front and rear wheels (VWF−VWR) actually becomes equal to or greater than the predetermined value C1. In such a case, if a hard braking operation has been performed, the processing for such judgment may not be carried out in time, and the condition for starting ABS control may be fulfilled before EBD control is started. Therefore, if it is judged in S220 that a hard braking operation has been performed, the operation is switched to EBD control immediately. As a result, even under circumstances where a hard braking operation has been performed, EBD control can be started at a desirable timing.

The processings of EBD control as described above relate to the case where the solenoid valve 130 of the rear-wheel fluid pressure system is switched between the pressure-holding mode and the pressure-increasing mode. However, the method for performing EBD control is not specifically limited. That is, the EBD control processings may be performed such that the solenoid valve 130 is switched among three modes, namely, the pressure-holding mode, the pressure-increasing mode and the pressure-reducing mode.

In the illustrated embodiment, the control device is implemented as a programmed general purpose computer. It will be appreciated by those skilled in the art that the control device can be implemented using single special purpose integrated circuits (e.g., ASIC) having a main or central processor section for overall, system-level control, and separate sections dedicated to performing various different specific computations, functions and other processes under control of the central processor section. The control device can be a plurality of separate dedicated or programmable integrated or other electronic circuits or devices (e.g., hardwired electronic or logic circuits such as discrete element circuits, or programmable logic devices such as PLDs, PLAs, PALs or the like). The control device can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the control device. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A brake device comprising:

brakes provided for front and rear wheels and that generate braking forces corresponding to fluid pressures that change through braking operation;

rotational speed detectors that detect rotational speeds of the wheels of a vehicle;

a deceleration calculator that calculates a vehicle body deceleration based on detection results of the rotational speed detectors;

a plurality of filters that filter the vehicle body deceleration obtained from the deceleration calculator, the plurality of filters having different cut-off frequencies; and an operating speed detector that detects a brake operating speed based on respective output values obtained from the plurality of filters;

wherein the vehicle body deceleration is input into each of the plurality of filters, the plurality of respective output values are supplied to the operating speed detector which then detects the brake operating speed based on the plurality of respective output values, the operating speed detector detects the brake operating speed based on a state of distribution of the output values obtained from the plurality of filters, and the operating speed detector specifies, based on the state of distribution of the output values, a filter from the plurality of filters whose output value is damped with respect to its input value, and calculates the brake operating speed based on a cut-off frequency of the specified filter.

2. A brake device comprising:

brakes provided for front and rear wheels and that generate braking forces corresponding to fluid pressures that change through braking operation;

rotational speed detectors that detect rotational speeds of the wheels of a vehicle;

a deceleration calculator that calculates a vehicle body deceleration based on detection results of the rotational speed detectors;

a plurality of filters that filter the vehicle body deceleration obtained from the deceleration calculator, the plurality of filters having different cut-off frequencies; and an operating speed detector that detects a brake operating speed based on respective output values obtained from the plurality of filters;

wherein the vehicle body deceleration is input into each of the plurality of filters, the plurality of respective output values are supplied to the operating speed detector which then detects the brake operating speed based on the plurality of respective output values, the operating speed detector detects the brake operating speed based on a degree of changes in the output values obtained from the plurality of filters, and the operating speed detector specifies, based on the degree of changes in the output values, a filter from the plurality of filters whose output value is damped with respect to its input value, and calculates the brake operating speed based on a cut-off frequency of the specified filter.

3. A brake device comprising:

brakes provided for front and rear wheels and that generate braking forces corresponding to fluid pressures that change through braking operation;

rotational speed detectors that detect rotational speeds of the wheels of a vehicle;

a deceleration calculator that calculates a vehicle body deceleration based on detection results of the rotational speed detectors;

a plurality of filters that filter the vehicle body deceleration obtained from the deceleration calculator, the plurality of filters having different cut-off frequencies; and an operating speed detector that detects a brake operating speed based on respective output values obtained from the plurality of filters;

wherein the vehicle body is input into each of the plurality of filters, the plurality of respective output values are supplied to the operating speed detector which then detects the brake operating speed based on the plurality of respective output values, the plurality of filters includes two filters that filter the vehicle body decelerations sequentially obtained from the deceleration calculator with different cut-off frequencies and the operating speed detector detects the brake operating speed based on a difference between output values obtained from the two filters.

4. The device according to claim 3, herein the difference between the output values increases as the brake operating speed increases.

5. A brake control device for controlling braking forces applied to rear wheels with respect to braking forces applied to front wheels, the brake control device comprising:

brakes provided for the front and rear wheels and that generate braking forces corresponding to fluid pressures that change through braking operation;

an actuator disposed in a fluid pressure supply system of the brakes corresponding to the rear wheels and that operates in at least two modes: (1) a pressure-holding mode where the fluid pressures applied to the corresponding brakes are kept constant, and (2) a pressure-increasing mode where the fluid pressures are increased; and a braking force distribution controller that controls the actuator such that the braking forces generated by the brakes for the rear wheels are reduced with respect to the braking forces for the front wheels, the braking force distribution controller including:

a plurality of filters that filter a vehicle body deceleration obtained based on a state of changes in rotational speeds of the wheels, the plurality of filters having different cut-off frequencies; and an operating speed detector that detects a brake operating speed based on respective output values obtained from the plurality of filters;

the braking force distribution controller starting control of the actuator if it is judged, based on a detection result of the operating speed detector, that a hard braking operation has been performed;

wherein the vehicle body deceleration is input into each of the plurality of filters, the plurality of respective output values are supplied to the operating speed detector which then detects the brake operating speed based on the plurality of respective output values, the operating speed detector detects the brake operating speed based on a state of distribution of the output values obtained from the plurality of filters, and the operating speed detector specifies, based on the state of distribution of the output values, a filter from the plurality of filters whose output value is damped with respect to its input value, and calculates the brake operating speed based on a cut-off frequency of the specified filter.

6. A brake control device for controlling braking forces applied to rear wheels with respect to braking forces applied to front wheels, comprising:

brakes provided for the front and rear wheels and that generate braking forces corresponding to fluid pressures that change through braking operation;

an actuator disposed in a fluid pressure supply system of the brakes corresponding to the rear wheels and that operates in at least two modes: (1) a pressure-holding mode where the fluid pressures applied to the corresponding brakes are kept constant, and (2) a pressure-increasing mode where the fluid pressures are increased; and a braking force distribution controller that controls the actuator such that the braking forces generated by the brakes for the rear wheels are reduced with respect to the braking forces for the front wheels, the braking force distribution controller including:

a plurality of filters that filter a vehicle body deceleration obtained based on a state of changes in rotational speeds of the wheels, the plurality of filters having different cut-off frequencies; and an operating speed detector that detects a brake operating speed based on respective output values obtained from the plurality of filters;

the braking force distribution controller starting control of the actuator if it is judged, based on a detection result of the operating speed detector, that a hard braking operation has been performed;

wherein the vehicle body deceleration is input into each of the plurality of filters, the plurality of respective output values are supplied to the operating speed detector which then detects the brake operating speed based on the plurality of respective output values, the operating speed detector detects the brake operating speed based on a degree of changes in the output values obtained from the plurality of filters)and the operating speed detector specifies, based on the degree of changes in the output values, a filter from the plurality of filters whose output value is damped with respect to its input value, and calculates the brake operating speed based on a cut-off frequency of the specified filter.

7. A brake control device for controlling braking forces applied to rear wheels with respect to braking forces applied to front wheels, comprising:

brakes provided for the front and rear wheels and that generate braking forces corresponding to fluid pressures that change through braking operation;

an actuator disposed in a fluid pressure supply system of the brakes corresponding to the rear wheels and that operates in at least two modes: (1) a pressure-holding mode where the fluid pressures applied to the corresponding brakes are kept constant, and (2) a pressure-increasing mode where the fluid pressures are increased; and a braking force distribution controller that controls the actuator such that the braking forces generated by the brakes for the rear wheels are reduced with respect to the braking forces for the front wheels, the braking force distribution controller including:

a plurality of filters that filter a vehicle body deceleration obtained based on a state of changes in rotational speeds of the wheels, the plurality of filters having different cut-off frequencies; and an operating speed detector that detects a brake operating speed based on respective output values obtained from the plurality of filters;

the braking force distribution controller starting control of the actuator if it is judged, based on a detection result of the operating speed detector, that a hard braking operation has been performed;

wherein the vehicle body deceleration is input into each of the plurality of filters, the plurality of respective output values are supplied to the operating speed detector which then detects the brake operating speed based on the plurality of respective output values, the plurality of filters includes two filters that filter the vehicle body deceleration with different cut-off frequencies and the operating speed detector detects the brake operating speed based on a difference between output values obtained from the two filters.

8. The device according to claim 7, wherein the difference between the output values increases as the brake operating speed increases.

9. A brake control device for controlling braking forces applied to rear wheels with respect to braking forces applied to front wheels, comprising:

brakes provided for the front and rear wheels and that generate braking forces corresponding to fluid pressures that change through a braking operation;

an actuator disposed in a fluid pressure supply system of the brakes corresponding to the rear wheels and that operates in at least two modes: (1) a pressure-holding mode where the fluid pressures applied to the corresponding brakes are kept constant, and (2) a pressure-increasing mode where the fluid pressures are increased; and a braking force distribution controller that controls the actuator such that the braking forces generated by the brakes for the rear wheels are reduced with respect to the braking forces for the front wheels, the braking force distribution controller including:

a plurality of filters that filter a vehicle body deceleration obtained based on a state of changes in rotational speeds of the wheels, the plurality of filters having different cut-off frequencies;

an operating speed detector that detects a brake operating speed based on output values obtained from the plurality of filters; and a rotational state detector that compares the rotational speeds of the front and rear wheels with each other and detects a state where the rotational speed of the rear wheels has become lower than the rotational speed of the front wheels by a predetermined value;

the braking force distribution controller starting control of the actuator based on detection results of the operating speed detector and the rotational state detector.

10. The device according to claim 9, wherein the operating speed detector detects the brake operating speed based on a state of distribution of the output values obtained from the plurality of filters.

11. The device according to claim 10, wherein the operating speed detector specifies, based on the state of distribution of the output values, a filter from the plurality of filters whose output value is damped with respect to its input value, and calculates the brake operating speed based on a cut-off frequency of the specified filter.

12. The device according to claim 9, wherein the operating speed detector detects the brake operating speed based on a degree of changes in the output values obtained from the plurality of filters.

13. The device according to claim 12, wherein the operating speed detector specifies, based on the degree of changes in the output values, a filter from the plurality of filters whose output value is damped with respect to its input value, and calculates a brake operating speed based on a cut-off frequency of the specified filter.

14. The device according to claim 9, wherein the plurality of filters includes two filters that filter the vehicle body deceleration with different cut-off frequencies; and the operating speed detector detects the brake operating speed based on a difference between output values obtained from the two filters.

15. The device according to claim 14, wherein the difference between the output values increases as the brake operating speed increases.

16. A brake control method for controlling braking forces applied to rear wheels with respect to braking forces applied to front wheels, in a braking system having brakes for the front and rear wheels and that generates braking forces corresponding to fluid pressures that change through braking operation, and an actuator disposed in a fluid pressure supply system of the brakes corresponding to the rear wheels, and that operates in at least two modes: (1) a pressure-holding mode where the fluid pressures applied to the corresponding brakes are kept constant, and (2) a pressure-increasing mode where the fluid pressures are increased; the method comprising the steps of:

filtering a vehicle body deceleration obtained based on a state of changes in rotational speeds of the wheels with a plurality of filters having different cut-off frequencies;

detecting a brake operating speed based on output values obtained from the plurality of filters;

comparing the rotational speeds of the front and rear wheels with each other and detecting a state where the rotational speed of the rear wheels has become lower than the rotational speed of the front wheels by a predetermined value; and starting braking force distribution control if the detected operating speed is equal to or higher than a predetermined value and if the rotational speed of the rear wheels is lower than the rotational speed of the front wheels by a predetermined value or more.

\* \* \* \* \*